Sept. 1, 1925.  F. HINRICHSEN  1,551,564
SEEDER
Filed July 16, 1923
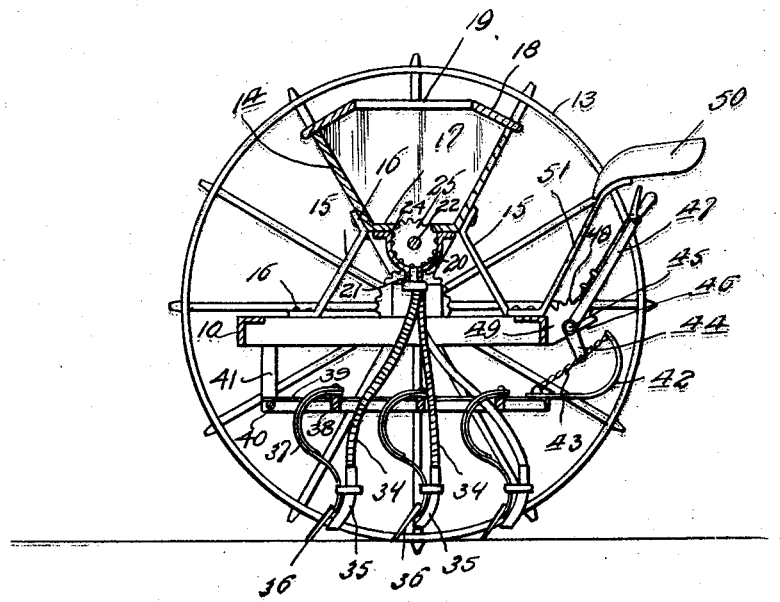
Witnesses:
F. Hinrichsen
Inventor
Attorney Patented Sept. 1, 1925.

1,551,564

UNITED STATES PATENT OFFICE.

FRIEDRICH HINRICHSEN, OF KINGSFORD, SASKATCHEWAN, CANADA.

SEEDER.

Application filed July 16, 1923. Serial No. 651,780.

*To all whom it may concern:*

Be it known that I, FRIEDRICH HINRICHSEN, a subject of the King of Great Britain, residing at Kingsford, in the Province of Saskatchewan and Dominion of Canada, have invented certain new and useful Improvements in Seeders, of which the following is a specification.

The present invention relates to improvements in seeders, and has for its prime object the provision of a simple construction which is highly efficient in use and composed of a minimum number of parts.

Another important object of the invention is the provision of a seeder of the character stated including a main frame, an auxiliary tool carrying frame pivotally mounted below the main frame, and means interposed between the frames for resiliently holding the auxiliary frame with the tool carried thereby in engagement with the ground.

With the above and other objects in view as will appear as the description proceeds, the invention resides in the novel features of construction, and in the combination and arrangement of parts as will be hereinafter more fully described and claimed.

In the drawing—

The figure is a vertical section through the implement embodying the features of my invention.

Referring to the drawing in detail it will be noted that a main frame 10 is provided which frame is supported by the traction wheels 13 in any suitable manner. This main frame 10 is preferably formed of angle iron. A seed hopper 14 is mounted on the main frame 10 and is supported above the same by supporting brackets 15 which are preferably in the form of metallic strips with the opposite ends 16 thereof extended at an angle and secured respectively upon the main frame 10 and upon the forward and rear sides of the hopper 14.

It will also be seen that the seed hopper 14 has its forward and rear sides inclined outwardly in opposite directions so as to reduce the transverse width of the hopper bottom 17. A cover 18 is provided for the hopper 14 and has an opening 19 through which the seed may be supplied to the hopper 14.

Supported on the under side of the hopper bottom 17 is the trough 20 which has a plurality of short discharge tubes 21, one only being shown in the drawing, depending therefrom. A shaft 22 is rotatably mounted longitudinally through the trough 20. Seed collecting rollers 25 are rigidly mounted on the shaft 22 so as to work through the slots 24 of the hopper bottom 17, and opposite the short discharge pipes 21.

The rollers 25 have transverse grooves or pockets formed in the peripheries thereof and work close to the curved side walls of the trough 20 so as to prevent the feed from reaching the trough 20 and the short discharge pipes 21, except when carried thereto in the pockets of the rollers 25 during rotation of the latter.

The shaft 22 may be driven in any suitable manner but it is preferable to drive the same from one of the wheels 13 by means of gearing and the like which are well known in this art and have not been shown in the drawing.

Flexible seed conveying tubes 34 are extended from the short pipes 21 and have their lower ends secured in the curved seed depositing tubes 35. Cultivating shovels 36 are secured on the lower ends of the seed depositing tubes 35 and extend below the latter. The cultivating shovels 36 are secured on the lower ends of the feed depositing tubes 35 and are extended below the latter.

The cultivating shovels 36 are also mounted on the lower ends of reverse curved suspending springs 37 which have their upper ends mounted on the transverse support 38 in the frame 39. The frame 39 is pivotally mounted at its forward ends on the pivot rod 40. This pivot rod 40 is carried in the lower ends of the depending bracket arm 41, suspended from the main frame 10.

The frame 39 has an arcuate spring 42 curved upwardly from its rear end, with the lower forward end of the spring securely fastened on the rear of the frame 39. The ends of the spring 42 are connected by a flexible member 39. The ends of the spring 42 are disposed so that the intermediate portion of this flexible member 43 is spaced from the intermediate portion of the spring.

A tensioning arm 44 is connected to an intermediate portion of the flexible member 43. This arm 44 is rigidly mounted on a rock shaft 45. This rock shaft is mounted in a bearing bracket 46 carried on the rear of the main frame 10. An operating lever 47 is provided for the rock shaft 45 and is rigidly mounted thereon.

Suitable locking means 48 is provided for the operating lever 47 and is adapted for engagement with a segmental rack 49 extended from the rear of the main frame 10 and arranged so that the rock shaft 45 operates through the segmental rack 49. A conventional form of operators' feet 50 is carried on a spring standard 51, mounted on the rear of the main rectangular frame 10 and the lever 47 is positioned so as to be in ready reach of the operator during use of the machine.

The lever 47 may be readily adjusted to vary the tension on the frame 39 and the parts suspended thereby. When the implement is not in use, the lever 47 may be adjusted to raise the frame 39 and all of the parts carried thereby on the shaft 40.

Having thus described my invention, what I claim as new is:—

A seed drill comprising a main frame, an auxiliary tool carrying frame pivotally mounted at its forward end in the main frame, means for resiliently holding the rear end of the auxiliary frame in a depressed position consisting of a curved spring attached at one end to the rear end of the auxiliary frame, a flexible member connected at its ends with the ends of the spring and having its intermediate portion spaced from the intermediate portion of the spring, a rock shaft mounted on the main frame, an operating lever rigidly mounted on the rock shaft, a tensioning arm rigidly mounted on the rock shaft and connected at its free end to the flexible member intermediate the ends of the latter, and means for holding the lever in predetermined positions of adjustment.

In testimony whereof I affix my signature.

FRIEDRICH HINRICHSEN.